(12) United States Patent
Haidacher et al.

(10) Patent No.: US 12,488,380 B2
(45) Date of Patent: *Dec. 2, 2025

(54) METHOD FOR PURCHASING GOODS, ACCESS AUTHORIZATIONS OR AUTHORIZATIONS FOR USING A SERVICE FROM A PLURALITY OF OFFERED GOODS, ACCESS AUTHORIZATIONS OR AUTHORIZATIONS FOR USING A SERVICE

(71) Applicant: SKIDATA GmbH, Grödig/Salzburg (AT)

(72) Inventors: Martin Haidacher, Grödig/Salzburg (AT); Roland Aigner, Grödig/Salzburg (AT)

(73) Assignee: SKIDATA GmbH, Salzburg (AT)

( * ) Notice: Subject to any disclaimer, the term of this patent is extended or adjusted under 35 U.S.C. 154(b) by 0 days.

This patent is subject to a terminal disclaimer.

(21) Appl. No.: 18/639,059

(22) Filed: Apr. 18, 2024

(65) Prior Publication Data

US 2024/0303718 A1 Sep. 12, 2024

Related U.S. Application Data

(63) Continuation of application No. 18/157,578, filed on Jan. 20, 2023, now Pat. No. 11,972,474, which is a
(Continued)

(30) Foreign Application Priority Data

Aug. 6, 2018 (EP) ..................................... 18187458

(51) Int. Cl.
*G06Q 30/0601* (2023.01)
*G07B 15/06* (2011.01)
(Continued)

(52) U.S. Cl.
CPC ....... *G06Q 30/0635* (2013.01); *G07B 15/063* (2013.01); *G07C 9/00896* (2013.01);
(Continued)

(58) Field of Classification Search
CPC .... G06Q 30/0635; G06Q 30/00; G06Q 20/00; G07B 15/063; G07C 9/00896;
(Continued)

(56) References Cited

U.S. PATENT DOCUMENTS

| 8,351,647 B2 | 1/2013 | Sharma et al. |
| 9,064,161 B1 | 6/2015 | Boman et al. |

(Continued)

FOREIGN PATENT DOCUMENTS

JP 2001-074855 A 3/2001

*Primary Examiner* — Nam V Nguyen
(74) *Attorney, Agent, or Firm* — Finch & Maloney PLLC

(57) ABSTRACT

A method for purchasing goods, access authorizations or authorizations for using a service from a plurality of offered goods, access authorizations or authorizations for using a service. A defined spatial region is subdivided into defined subregions assigned, in each case, to a purchasable good, access authorization or authorization for using a service. A good, an access authorization or an authorization for using a service from a plurality of offered goods, access authorizations or authorizations for using a service is purchased, and a user registered in advance for carrying out the method on the basis of biometric features and/or on the basis of features, which may be assigned to the user uniquely, or an item registered in advance for carrying out the method is identified and localized in the defined subregion (1, 2, 3) assigned to the good, access authorization or authorization for using a service.

14 Claims, 1 Drawing Sheet

Related U.S. Application Data continuation of application No. 16/455,905, filed on Jun. 28, 2019, now Pat. No. 11,587,147.

(51) Int. Cl.
    *G07C 9/00*     (2020.01)
    *G07C 9/25*     (2020.01)
    *G07C 9/27*     (2020.01)
    *G07C 9/28*     (2020.01)
    *H04L 9/40*     (2022.01)

(52) U.S. Cl.
    CPC .............. *G07C 9/25* (2020.01); *G07C 9/27* (2020.01); *G07C 9/28* (2020.01); *H04L 63/0861* (2013.01); *H04L 63/102* (2013.01)

(58) Field of Classification Search
    CPC .... G07C 9/25; G07C 9/27; G07C 9/28; H04L 63/0861; H04L 63/102
    USPC ........................................ 340/571; 705/26.81
    See application file for complete search history.

(56) References Cited

U.S. PATENT DOCUMENTS

| | | |
|---|---|---|
| 9,786,176 B2 | 10/2017 | Northrup et al. |
| 9,805,360 B1 | 10/2017 | Jaber |
| 9,990,659 B2 | 6/2018 | Shanmugam et al. |
| 10,380,814 B1 | 8/2019 | Mathiesen et al. |
| 11,205,168 B2 | 12/2021 | DeLuca et al. |
| 11,587,147 B2 | 2/2023 | Haidacher et al. |
| 11,972,474 B2 * | 4/2024 | Haidacher .......... G07C 9/00896 |
| 2003/0132840 A1 | 7/2003 | Bahar |
| 2012/0307051 A1 | 12/2012 | Welter |
| 2014/0206428 A1 | 7/2014 | Thompson et al. |
| 2014/0263631 A1 | 9/2014 | Muniz |
| 2017/0018184 A1 | 1/2017 | Northrup et al. |
| 2017/0098209 A1 | 4/2017 | Laracey et al. |
| 2017/0323299 A1 | 11/2017 | Davis |
| 2018/0096566 A1 | 4/2018 | Blair, II et al. |
| 2018/0232796 A1 | 8/2018 | Glaser et al. |
| 2018/0240180 A1 | 8/2018 | Glaser et al. |
| 2020/0043079 A1 | 2/2020 | Haidacher et al. |

* cited by examiner

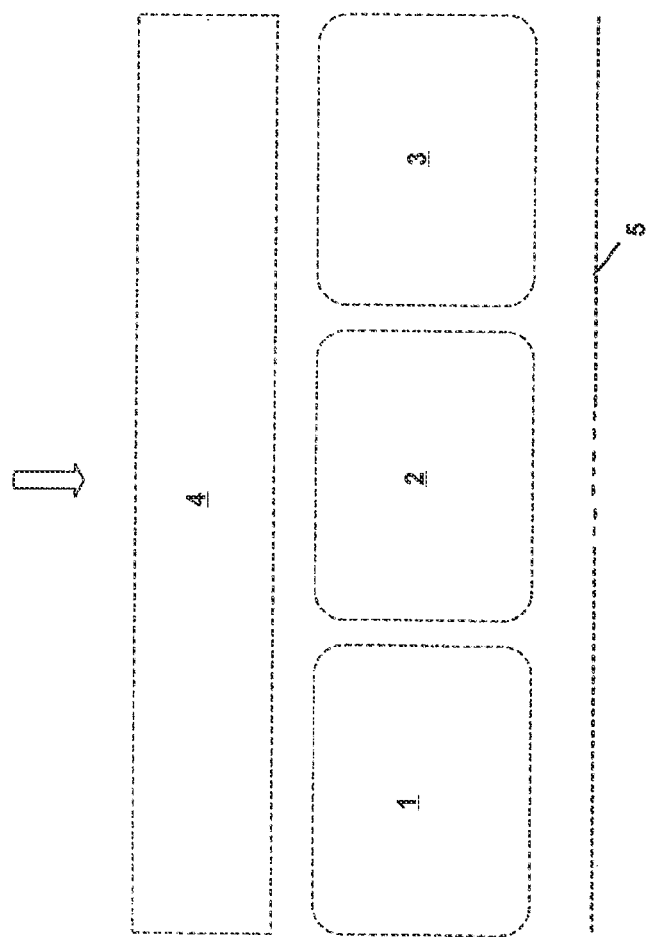

METHOD FOR PURCHASING GOODS, ACCESS AUTHORIZATIONS OR AUTHORIZATIONS FOR USING A SERVICE FROM A PLURALITY OF OFFERED GOODS, ACCESS AUTHORIZATIONS OR AUTHORIZATIONS FOR USING A SERVICE

This application is a Continuation of U.S. patent application Ser. No. 18/157,578 filed Jan. 20, 2023, now U.S. Pat. No. 11,972,474, which is a Continuation of U.S. patent application Ser. No. 16/455,905 filed Jun. 28, 2019, now U.S. Pat. No. 11,587,147 granted Feb. 21, 2023, which claims priority from European patent application serial no. 18187458.7 filed Aug. 6, 2018.

FIELD OF THE INVENTION

The present invention relates to a for purchasing goods, access authorizations or authorizations for using a service from a plurality of offered goods, access authorizations or authorizations for using a service. Furthermore, the invention relates to a system for purchasing goods, access authorizations or authorizations for using a service from a plurality of offered goods, access authorizations or authorizations for using a service.

BACKGROUND OF THE INVENTION

It is known from the prior art to actively purchase access authorizations or authorizations for using a service prior to visiting an installation or using a service, for example via the Internet by means of Internet-enabled electronic devices. Here, the required actuation of the electronic devices results in a delay and stress. Alternatively, access authorizations or authorizations for using a service can be purchased by actuating an automatic machine or at a cash desk, which may likewise disadvantageously result in a delay and stress.

SUMMARY OF THE INVENTION

The present invention is based on the object of specifying a method for purchasing goods, access authorizations or authorizations for using a service from a plurality of offered goods, access authorizations or authorizations for using a service, convenience for users being increased by carrying out the method. Furthermore, a system for purchasing goods, access authorizations or authorizations for using a service from a plurality of offered goods, access authorizations or authorizations for using a service should be specified.

This object is achieved for a system and a method according to the features of the independent claim(s).

Thus, a method is suggested for purchasing goods, access authorizations or authorizations for using a service from a plurality of offered goods, access authorizations or authorizations for using a service, in the context of which a defined spatial region is subdivided into defined subregions assigned in each case to a purchasable good, access authorization or authorization for using a service. According to the invention, a good, an access authorization or authorization for using a service from a plurality of offered goods, access authorizations or authorizations for using a service is purchased, in that a user registered in advance for carrying out the method on the basis of biometric features and/or on the basis of features, which may be assigned to the user uniquely, or an item registered in advance for carrying out the method is identified and localized in the defined subregion assigned to the good, access authorization or authorization for using a service.

An item registered in advance for carrying out the method is an item located with a person, for example a mobile electronic device, or a vehicle. The mobile electronic device may be e.g. a smartphone or an electronic module for wireless communication integrated into a vehicle.

The defined subregions are for example provided in the vicinity of the access control devices for checking the validity of purchasable access authorizations or the entrances or exits to a region requiring a purchasable access authorization or in the vicinity of the locations where the purchasable services are provided. Also, the subregions can be provided in front of platforms, at entrances of bus- or tramways, at entrances of skiing regions or at entrances and/or exits of car parks and multi-storey car parks.

The purchase takes place after identifying and localizing a user registered in advance for carrying out the method or an item registered in advance for carrying out the method in a subregion, wherein the identification and localization takes place on the basis of the detection of at least one unique feature assigned to the user or at least one unique ID assigned to the item by means of suitable devices, connected to a server, for identification and localization, and wherein payment information is assigned to the unique feature assigned to the user registered in advance or the unique ID assigned to the item registered in advance, which payment information is saved on the server and used for processing the payment for the purchase of a good, an access authorization or the authorization for using a service. The payment information may for example be credit card data, account data or a balance.

According to the invention, a validation line, which is visible for the users and labelled as such, is optionally provided for the subregions, wherein payment only takes place when a user, registered in advance, or an item, registered in advance, located with a person crosses the validation line after a subregion; by crossing the validation line, the purchase of a good, an access authorization or an authorization for using a service is confirmed. A plurality of adjacent subregions may have a common validation line.

If no validation line is provided, the purchase takes place automatically or after expiry of a predetermined time of the stay of a user or an item located with a person in a subregion.

According to a further embodiment of the invention, the payment only takes place if predetermined movement patterns or gestures of a hand of a user registered in advance or a person, who carries an item, registered in advance, with them, are detected during the stay in a subregion, which movement patterns or gestures are used as confirmation. For this purpose, images from cameras, which cover the subregions, are analysed by an analysis unit connected to the server. For the case that cameras can be used for localization and identification, the required pictures can be created by these cameras which are present anyway.

Prior to the purchase of a good, an access authorization or authorization for using a service, according to a further embodiment, a check is performed as to whether this good, access authorization or authorization for using a service has already been purchased by the identified person within a predetermined time period before the current time, wherein no purchase is carried out if this is the case.

According to a development of the invention, a "cancellation" line, which is visible for the users and labelled as such, may be provided for each subregion, particularly for a subregion without a validation line, a cancellation of the process, i.e. the purchase of a good, an access authorization or an authorization for using a service, being carried out by crossing the cancellation line within a predetermined time period.

The crossing of the validation line and the cancellation line is detected on the basis of the identification and localization methods for the subregions described in the following.

According to a further embodiment of the invention, the current process, i.e. the purchase of a good, an access authorization or an authorization for using a service, is cancelled if predetermined movement patterns or gestures of a hand of a user registered in advance or a person, who carries an item, registered in advance, with them, are detected during the stay in a subregion. For this purpose, images from cameras, which cover the subregions, are analysed by an analysis unit connected to the server. For the case that cameras can be used for localization and identification, the required pictures can be created by these cameras which are present anyway.

According to a further embodiment of the invention, preferably if no cancellation line and no validation line is provided, a cancellation of the process, i.e. the purchase of an access authorization or an authorization for using a service, can be carried out by leaving a subregion within a predetermined time period. This is important, for example, if a service is used directly in a subregion, which may be the case for example in the case of the electric charging of cars.

Optionally, an identification region may be provided in front of the subregions, which must be passed through in order to reach a subregion. If a person, registered in advance, or a person, who carries an item, registered in advance, with them, is located in the identification region, a localization and identification is carried out, as a result of which the process of purchasing a good, an access authorization or an authorization for using a service can be accelerated if the person or the item is located in a subregion, as the data required for carrying out the purchase are already present; this may be relevant in particular if a high crowd density is to be expected, for example in the case of public transport. Here, after the localization and identification of a person or an item, tracking is carried out, in order to determine whether the person or the item are subsequently located in a subregion. The tracking takes place by means of the method described in the following for localizing a person or an item by means of the means for identification and localization, which is connected to the server.

The subregions, the identification region, the validation line and the cancellation line are preferably highlighted in colour, in order to increase the customer friendliness of the method.

According to the invention, the users may be informed by means of display devices about the assignment of the subregions to the goods, access authorizations or authorizations for using a service to be purchased. The display devices can for example be arranged above the subregions or realized as LED pictograms integrated into the subregions. In order to ensure a high degree of flexibility with regards to the assignment of the subregions, the display devices may be connected to the server and controllable by the same.

After the purchase of a good, an access authorization or authorization for using a service, on the server, a corresponding entry is saved and the unique feature assigned to the user is assigned or the unique ID assigned to the item is assigned.

For the case of a user registered in advance, the identification and localization preferably take place in that optical data of the persons present in the subregion, which are biometric features and/or features which can be uniquely assigned to the detected persons, are detected by means of cameras, which cover the respective subregion and the identification region, if provided, wherein the detected data are compared with unique features assigned to the users registered in advance during registration, which are stored on a server, wherein a registered user is detected if the detected data match features stored on the server. On the basis of the data of the cameras about the presence of the user, the user is localized and assigned to one of the subregions or the identification region.

Here, at least one camera may be assigned to the subregions and the identification region in each case. Alternatively, at least one camera may cover a plurality of subregions and/or the identification region.

Here, facial recognition may for example be carried out by means of the cameras; also a numeric vector, which represents the recorded face, may be created on the basis of a neural network. According to a further embodiment, the retina of the persons may be scanned, if there is a sufficiently high resolution of the cameras, and the result may be used as a biometric feature. The process is analogous for the case of a vehicle without an electronic module for wireless communication integrated into the vehicle, wherein the vehicle is identified and localized by means of cameras on the basis of a unique feature, for example the number plate or on the basis of a combination of features.

Predetermined movement patterns or gestures of a hand of a user registered in advance or a person, who carries an item, registered in advance, with them, may also be detected by means of evaluation units connected to these cameras during the stay in a subregion, as a result of which the current process can be confirmed or cancelled. For example, upon recognition of a "thumbs up" gesture, the current process may be confirmed, wherein, upon recognition of a "thumbs down" gesture, the current process may be cancelled.

According to a development of the invention, the desired number of goods, access authorizations or authorizations for using a service to be purchased can be detected on the basis of the recognition, by means of analysis units connected to cameras, of predetermined movement patterns or gestures of a hand or both hands of a user, registered in advance, or a person, who carries an item, registered in advance, with them, during the stay in a subregion. For example, the number of fingers shown may correspond to the number of desired goods, access authorizations or authorizations for using a service to be purchased, wherein no gesture is required for the purchase of only one good, access authorization or authorization for using a service.

If the subregions and, if provided, the identification region are covered by a GNSS (Global Navigation Satellite System) signal, for example by a GPS, Galileo or GLONASS signal, the identification and localization for the case of a mobile electronic device takes place on the basis of the GNSS data of the GNSS module (for example for the case of GPS data of the GPS module) of the mobile electronic device or, for the case that the mobile electronic device is an electronic module for wireless communication integrated into a vehicle, of the GNSS module of the vehicle, which GNSS data are transmitted via a connection for wireless communication according to a standard for wireless communication, which may for example be a BLE, GSM, WLAN or UWB standard, to the server via transceiver units connected to the server, which cover the subregions, together with a unique ID assigned to the mobile electronic device, for example the IMEI number of the mobile electronic device. The transmitted ID is compared with IDs stored in a server and assigned to the mobile electronic devices registered in advance, which IDs were specified during registration, wherein a registered mobile electronic device is detected if the transmitted ID matches an ID stored on the server.

Alternatively or if the subregions and, if provided, the identification region are not covered by a GNSS signal, which may be the case for example in some underground stations, the mobile electronic devices or electronic modules for wireless communication integrated into a vehicle can be identified and localized by means of means, connected to the server, for the detection of mobile electronic devices, which cover the subregions, by means of a standard for wireless communication, for example by means of WLAN, BLE or UWB.

Here, the identification and localization can take place in that, on the basis of a reference signal strength, which generally corresponds to the signal strength at a distance of one metre and which is contained as information in the signal of the mobile electronic device or an electronic module for wireless communication integrated into a vehicle together with a unique ID assigned to the mobile electronic device or is stored in a table saved on the server depending on the mobile electronic device, e.g. the model of the mobile telephone, the distance between the mobile electronic device or the electronic module integrated into a vehicle and BLE, UWB or WLAN transceiver units is determined, wherein a trilateration, or in the case of more than three transceiver units, a multilateration is subsequently carried out. The transmitted ID is compared with IDs stored on a server and assigned to the mobile electronic devices registered in advance, which IDs were specified during registration, wherein a registered mobile electronic device or electronic module integrated into a vehicle is detected if the transmitted ID matches an ID stored on the server.

According to the invention, some or all subregions can be passed through sequentially, in order to purchase a combination of various goods, access authorizations or authorizations for using a service.

According to a development of the invention, at least one subregion can be assigned to a plurality of goods, access authorizations or authorizations for using a service, wherein the selection of the desired good, access authorization or authorization for using a service to be purchased can be detected on the basis of the recognition, by means of analysis units connected to cameras, of predetermined movement patterns or gestures of a hand or both hands of a user, registered in advance, or a person, who carries an item, registered in advance, with them, during the stay in this subregion.

Here, a gesture or a movement pattern is assigned to each of the goods, access authorizations or authorizations for using a service, to which the subregion is assigned. Furthermore, the number of goods, access authorizations or authorizations for using a service to be purchased can, as explained previously, be detected on the basis of the recognition of the number of assigned movement patterns or gestures of a hand or both hands of a user, registered in advance, or a person, who carries an item, registered in advance, with them.

Here, a standard good or a standard access authorization or authorization for using a service can be defined for a subregion of this type, for the purchase of which no movement pattern or no gesture is required.

For example, a subregion in the region of an entry region of a means of transport may be assigned to day tickets for one, two or three days, wherein by showing two fingers or by means of a further gesture, a two-day ticket can be bought and by showing three fingers or by means of a further gesture, a three-day ticket can be bought.

In a subregion of this type, a plurality of different goods, access authorizations or authorizations for using a service can be purchased sequentially. For example, three beers and two orange juices may be purchased with the sequence of showing the gesture for beer followed by showing three fingers, followed by showing the gesture for orange juice followed by showing two fingers.

For the case that the subregions are provided directly in front of an automatic machine, the current selection may be displayed by means of a display device which is separate or integrated into the automatic machine, wherein the selection is cancelled by showing both palms in the direction of the automatic machine or by means of a "thumbs down" gesture. The cameras for detecting the gestures or movement patterns can also be integrated into the automatic machine here. After payment of the order, the goods are dispensed by means of the automatic machine.

The number of subregions may be arbitrary and depends on the offered goods, access authorizations or authorizations for using a service. A plurality of subregions may be provided in a region of an entry region of a means of transport, which subregions are in each case assigned to the purchase of a ticket type. For example, three subregions can be provided in front of a platform of an underground station, which subregions are assigned to the purchase of a day ticket, a ticket for a short journey and a ticket for a long journey in each case. In a skiing region, a plurality of subregions may be provided, for example, which are assigned to the purchase of a ticket type in each case; for example subregions may be provided for a day ski pass, for a 2-hour ski pass, for a 3-hour ski pass, etc.

Furthermore, in car parks and multi-storey car parks, the entrances or exits may be realized as subregions in the sense of the invention, wherein different entrances or exits are assigned to different parking ticket types, as a result of which a convenient payment of parking charges is enabled. For example, by choosing the entrance, a weekly parking authorization or a short-stay parking ticket may be purchased. Furthermore, cinema or concert tickets can be purchased by means of the method according to the invention. A further exemplary embodiment is the purchase of goods, for example meals in a fast-food restaurant or in a canteen, wherein a plurality of subregions are provided, which are assigned to a menu or an offered meal in each case. When dispensing the goods, the order is assigned to the respective person on the basis of the biometric features and/or the features, which can be assigned to the user uniquely, or on the basis of the ID of the mobile electronic device.

The method according to the invention can for example also be carried out for the payment of tolls, wherein at a toll gate, each lane is assigned to a type of mileage- or time-dependent toll. For example, at the toll gate, an annual ticket, a weekly ticket, a single journey or a round-trip ticket can be purchased depending on the chosen lane.

For the case that the subregions are provided at exits of car parks and multi-storey car parks, the vehicles, registered in advance, driving in are identified by means of means, provided at the entrances, for detecting mobile electronic devices by means of a standard for mobile communication, if an integrated electronic module for wireless communication is provided in a vehicle, or by means of cameras on the basis of the number plate, as a result of which the calculation of the parking charges, to be paid by means of the method according to the invention at the exit, is enabled.

According to a development of the invention, the subregions and, if present, the identification regions can dynamically be adapted as a function of the demand for the purchasable goods, access authorizations or authorizations for using a service. High flexibility and high convenience for users are ensured as a result. This is achieved in that, on the server, the parameters for definition of the subregions and the identification region are changed, wherein the control of the means for identification and localization is adapted to the parameters. According to the invention, identification regions and subregions may be activated and deactivated.

BRIEF DESCRIPTION OF THE DRAWING

The invention is explained in more detail by way of example in the following:

The sole FIGURE is a diagrammatic representation showing the features of the invention.

DETAILED DESCRIPTION OF THE PREFERRED EMBODIMENTS

Three subregions 1, 2, 3 provided in front of a platform of an underground station are illustrated in the FIGURE, which subregions are assigned to the purchase of a day ticket, a ticket for a short journey and a ticket for a long journey in each case.

Furthermore, an identification region 4 is provided in front of the three subregions, which must be passed through in the direction of the arrow in order to reach the subregions 1, 2, 3. The subregions 1, 2, 3 and the identification region 4 are covered by GNSS signals in the example shown.

According to the invention, a day ticket, a ticket for a short journey or a ticket for a long journey is purchased in that a user registered in advance for carrying out the method on the basis of biometric features and/or on the basis of features, which may be assigned to the user uniquely, or an item registered in advance for carrying out the method, located with a person, for example a mobile telephone, is identified and localized in the respective subregion 1, 2, 3.

In the example shown, users registered in advance for carrying out the method or items registered in advance for carrying out the method and located with a person are identified and localized in the identification region 4. In the case of persons, this takes place in that optical data of the persons present in the identification region 4 are detected by means of cameras which cover the identification region 4 and the subregions 1, 2, 3, which data may be biometric features and/or features, which can be assigned to the detected persons uniquely, wherein the detected data are compared to unique features assigned to the users registered in advance during registration, which are stored in a server, and wherein a registered user is detected if the detected data match features stored on the server. After the identification, the identified persons are tracked by means of the cameras, wherein, if an identified person is located in one of the subregions 1, 2, 3, payment information assigned to the identified person and stored on the server is used for processing the payment for a day ticket, a ticket for a short journey or a ticket for a long journey. The payment information may be specified during the registration of the users for example.

In the example shown, a validation line 5 is provided after subregions 1, 2, 3 in the direction of the platform, the purchase of a ticket assigned to the respective subregion 1, 2, 3 being confirmed on the part of the persons localized in a subregion 1, 2, 3 and registered in advance by means of the crossing of the validation line. The validation line is covered by at least one camera here.

For the case of a mobile telephone registered in advance, the identification and localization takes place in the identification region 4, in that on the basis of the GNSS data of the GNSS module of the mobile telephone, the GNSS data are transmitted by means of a connection for wireless data communication according to a standard for wireless communication, which may for example be a BLE, GSM, WLAN or UWB standard, to the server by means of transceiver units connected to the server, which cover the identification region 4, the subregions 1, 2, 3 and the validation line 5, together with a unique ID assigned to the mobile telephone, for example the IMEI number of the mobile electronic device. The transmitted ID is compared with IDs stored on the server and assigned to the mobile electronic devices registered in advance, which IDs were specified during registration, wherein a registered mobile telephone is detected if the transmitted ID matches an ID stored on the server.

After the identification, the mobile telephones are tracked on the basis of the GNSS data of the GNSS module of the mobile telephones, which are transmitted by means of the connection for wireless data communication to the server by means of transceiver units connected to the server, wherein, if an identified mobile telephone is located in one of the subregions 1, 2, 3, payment information assigned to the ID of the identified mobile telephone and stored on the server is used for processing the payment for a day ticket, a ticket for a short journey or a ticket for a long journey. The payment information may be specified during the registration of the mobile telephones for example. If the person who carries a mobile telephone localized in a subregion 1, 2, 3 with them crosses the validation line 5, which is detected on the basis of the GNSS data, the purchase of a ticket, to which the respective subregion 1, 2, 3 is assigned, is confirmed.

The tickets are transmitted to the mobile telephone in electronic form; alternatively, the purchased ticket is only linked with the registered user or with the registered mobile telephone in a database of the server, so that even users without a mobile telephone can purchase tickets.

The invention claimed is:

1. A method for confirming purchase of goods from a plurality of offered goods, the method comprising:
   subdividing a defined spatial region into at least one subregion and assigning to the at least one subregion a plurality of goods,
   identifying a user by facial recognition of the user's face using cameras, and localizing the identified user in the at least one subregion to which the plurality of goods are assigned,
   detecting goods selected by the identified user among the plurality of goods on the basis of a recognition, by means of an analysis unit connected to the cameras, and
   validating the purchase of the selected goods while crossing a threshold.

2. The method of claim 1, further comprising assigning the identified user with an electronic device.

3. The method of claim 1, wherein the threshold is a visible validation line.

4. The method of claim 1, further comprising providing the threshold as a visible validation line and arranging the validation line after the at least one subregion such that the identified user crosses the validation line upon exiting the at least one subregion.

5. The method of claim 1, further comprising providing a validation line (5) as the threshold for the at least one subregion, the validation line being visible to the user and labeled as the validation line, and only validating payment for the purchase of the selected goods when the identified user crosses the validation line (5) after a stay in the at least one subregion (1, 2, 3).

6. The method of claim 1, further comprising providing a cancellation line, which is visible to the user and labeled as a cancellation line, for the at least one subregion (1, 2, 3), carrying out a cancellation of the purchase of the selected goods when the cancellation line is crossed by the identified user.

7. The method of claim 1, further comprising dynamically adapting a size of the at least one subregion (1, 2, 3) and, if present, an identification region (4) as a function of a demand for the goods.

8. The method of claim 1, further comprising passing through some or all of the at least one subregion (1, 2, 3) sequentially, in order to purchase a combination of various goods.

9. The method of claim 1, further comprising detecting a desired number of goods to be purchased by recognizing, via analysis units connected to cameras, predetermined movement patterns or gestures of a hand or both hands of the identified user during a stay in the at least one subregion.

10. The method of claim 1, further comprising informing the identified user by display devices about assignment of the at least one subregion (1, 2, 3) to the goods to be purchased.

11. A system for confirming the purchase of goods from a plurality of offered goods, the system comprising,
a defined spatial region, which is subdivided into at least one subregion (1, 2, 3), each of the at least one subregion being assigned to respective offered goods,
a good from the plurality of offered goods can be purchased in that an electronic device is associated with the user and located in the at least one subregion (1, 2, 3) of the offered goods to be purchased,
the electronic device being usable by the user to select the goods to be purchased from the offered goods,
means are provided for identifying and localizing the user in the at least one subregion (1, 2, 3), the means comprising facial recognition of the user's face using cameras to identify the user,
at least one analysis unit connected to the cameras for detecting the selected goods on the basis of a recognition, and
a visible threshold line being arranged after the at least one subregion such that the selected goods are purchased, and the purchase of the selected goods is validated when the identified user crosses the threshold line.

12. The system of claim 11, wherein an identification region (4) is provided in front of the at least one subregion (1, 2, 3) such that the identification region must be passed through in order to reach the at least one subregion (1, 2, 3), and when the identified user is located in the identification region (4), a localization and identification is carried out, as a result of which a process of purchasing the offered goods is accelerated and wherein, the means for identification and localization is connected to an analysis unit, the means for identifying and localizing the identified user in the at least one subregion being configured to track the identified user in order to determine whether the identified user is subsequently located in the at least one subregion (1, 2, 3).

13. The system of claim 11, wherein a size of the at least one subregion (1, 2, 3) and, if present, an identification region (4) is dynamically adaptable as a function of a demand for the offered goods.

14. The system of claim 11, wherein the system is implemented in one of:
an entry region of a means of transport, and the at least one subregion is assigned to the purchase of a ticket type in each case; or
a region of a skiing region, and the at least one subregion is assigned to the purchase of a ski pass type in each case; or
a region of a multi-story car park, and the at least one subregion corresponds to different entrances which are assigned to different parking ticket types; or
a region of a fast-food restaurant or a canteen, and the at least one subregion is assigned to a menu or an offered meal in each case; or at a toll gate, and each of the at least one subregion is a lane assigned to a type of mileage- or time-dependent toll.

\* \* \* \* \*